United States Patent [19]

Hammond

[11] 4,240,599
[45] Dec. 23, 1980

[54] VEHICLE LAUNCHING DEVICE

[75] Inventor: Joseph Hammond, Cornwells Heights, Pa.

[73] Assignee: The United States of America as represented by the Secretary of the Navy, Washington, D.C.

[21] Appl. No.: 34,883

[22] Filed: Apr. 30, 1979

[51] Int. Cl.$^3$ .............................................. B64F 1/04
[52] U.S. Cl. ........................................ 244/63; 92/88; 104/156; 124/61; 124/71; 188/271; 293/136
[58] Field of Search ............. 244/63, 114 R; 104/155, 104/156, 157, 158, 159, 160, 161, 250, 256, 254; 92/88, 163, 169; 124/56, 61, 71, 73, 75; 406/83; 293/136; 188/271, 268, 311; 267/35, 134

[56] References Cited

U.S. PATENT DOCUMENTS

| | | | |
|---|---|---|---|
| 2,497,916 | 2/1950 | Stambaugh | 104/161 |
| 2,703,211 | 3/1955 | Hinchman et al. | 244/63 |
| 3,420,220 | 1/1969 | Ferrando | 124/71 |
| 3,690,423 | 9/1972 | Trongeau | 188/268 |
| 3,891,200 | 6/1975 | Schwarz | 293/136 |
| 4,002,244 | 1/1977 | Matsumoto et al. | 188/268 |

FOREIGN PATENT DOCUMENTS 508823  2/1952  Belgium .................................. 188/268

*Primary Examiner*—Charles E. Frankfort
*Attorney, Agent, or Firm*—R. S. Sciascia; Henry Hansen; Armand M. Vozzo, Jr.

[57] ABSTRACT

A pneumatic system for launching aircraft wherein an elongated frame having a pressurized interior chamber is volumetrically related and communicatively connected to a longitudinally-slotted cylinder supported within the frame so that expansion of air into the cylinder produces a desired thrust pressure therein that is equalized by the residual pressure external of the cylinder within the chamber. A piston member slidably contained within the cylinder is adapted to receive the compressed air and is connected to a shuttle for accelerating the aircraft to be launched. The shuttle is releasably restrained at the rearward end of the cylinder and is adapted to travel longitudinally through the slot which is dynamically sealed by a flexible strip as the shuttle passes through the slot to preserve thrust pressure within the cylinder. Means for braking the shuttle after launch include a hydraulic shock absorber connected to the frame at the forward end of the cylinder, and a longitudinal elastomeric member attached at one end thereof to the shock absorber within the cylinder. The elastomeric member is formed having a gradually reduced cross-sectional area from either end thereof so that upon impact by the moving shuttle, the longitudinal surface of the member expands against the inside of the cylinder to dissipate a portion of the kinetic energy therealong and provide sufficient dampening, in cooperation with the absorber, to effectively brake the shuttle near the forward end of the frame.

8 Claims, 4 Drawing Figures

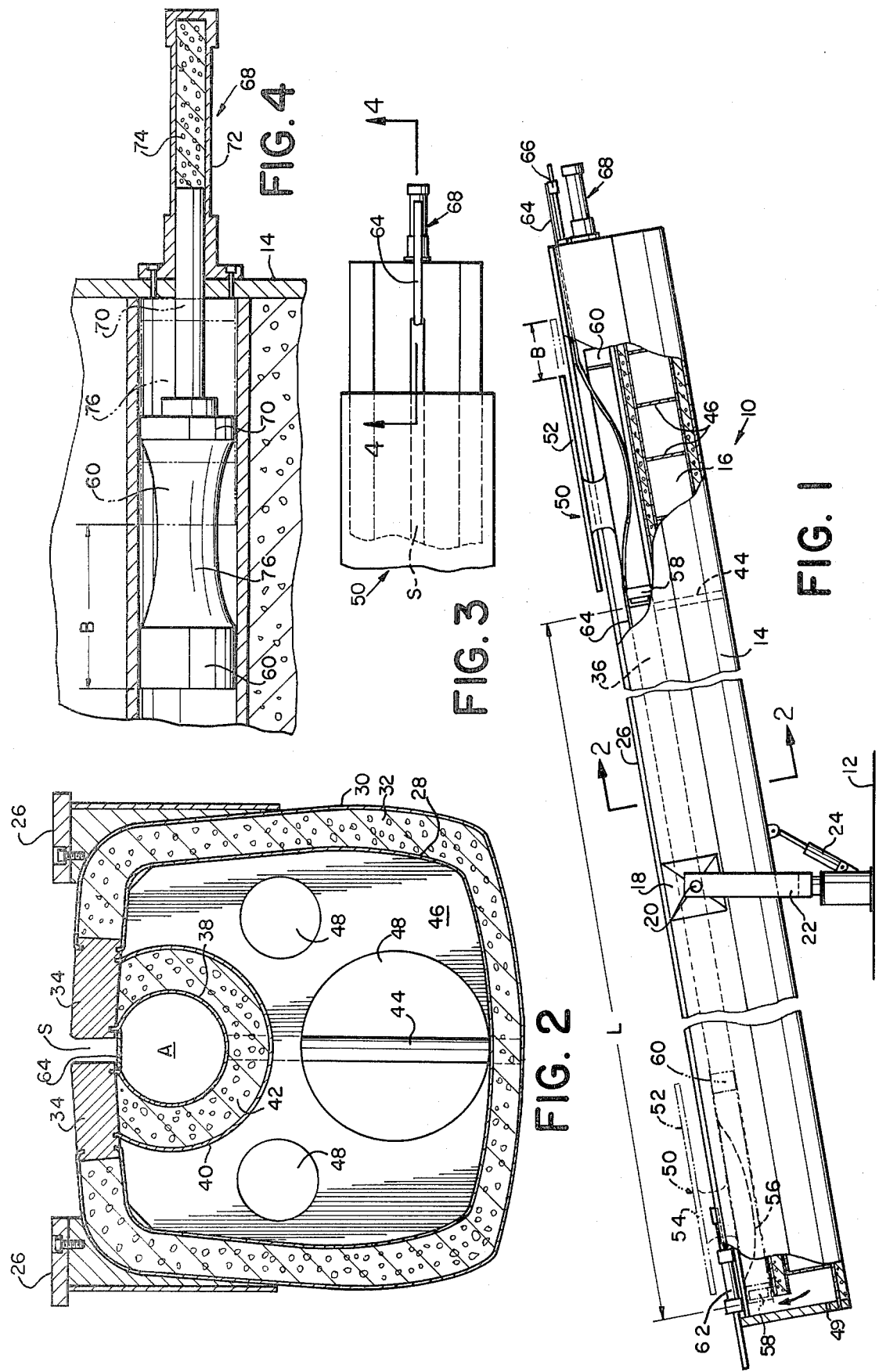

VEHICLE LAUNCHING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a vehicle launching, and more particularly to an improved pneumatic system for launching aircraft.

One type of aircraft launcher known to the prior art utilizes pneumatic pressure to force a piston along a cylinder, the cylinder having an elongated slot extending longitudinally thereof to permit coupling of a launching shuttle external of the cylinder with the piston which is internal thereof. Problems have arisen in the effective operation of this type of aircraft launcher because the longitudinal slot, which is sealed behind the piston to maintain thrust pressure, creates a structural discontinuity in the cylinder thereby causing a loss of hoop strength, the characteristic ability of a closed cylinder to withstand radial forces. Without hoop strength, the slotted cylinder distorts upon the application of internal pressure, responding thereto like a curved beam which opens up along the sealed slot thereby venting the thrust pressure and adversely affecting launcher operation. Further problems have been experienced in stopping the fast-moving shuttle after launch within a relatively short braking distance without damaging the launching structure from the high-speed impact.

In aircraft launching systems known to the art, the problems associated with the structural discontinuity of the slotted launch cylinder have been treated by constructing the cylinder in as nearly a rigid fashion as possible. Thus, some cylinders have been embedded in concrete, while other cylinders are provided with structural support frames of a heavy nature so that the tendency of the cylinder to open up as a result of internal pressures is resisted by the structural strength of material external to the cylinder. Although such rigidly confined structures have been satisfactory in preventing distortion of the launch cylinder during operation, such cylinders, because of their unflexible nature, must be manufactured and aligned to very close tolerances with respect to the rest of the launching system in order to avoid high friction resistance to the piston which causes hot spots and undue wear. In addition, the heavy structural surroundings of such cylinders has resulted in aircraft launchers that are very difficult to handle and maneuver. Regarding the problems associated with braking the shuttle after launch, a variety of energy absorbing devices have been devised that stop the shuttle; however, these devices have not been entirely satisfactory in stopping the shuttle within a limited brake stroke without damaging the launching structure from the shock of high impact forces.

SUMMARY OF THE INVENTION

Accordingly, it is an object of the present invention to provide an improved aircraft launching system wherein a longitudinally slotted pneumatic launch cylinder withstands distortion along the slot from the thrust pressure internal of the cylinder during operation, while retaining a degree of longitudinal flexibility so as to accommodate minor lateral movements of the launching mechanism during operation.

Another object of the present invention is to provide a launching system wherein the high-speed motion of the unlaunched moving mechanism is effectively dampened within a limited brake stroke so as to avoid damage to the system structure.

Still another object of the present invention is to provide an aircraft launcher which is lightweight and simple in construction, yet sturdy and reliable in operation.

Briefly, these and other objects of the present invention are accomplished by a pneumatic system for launching aircraft wherein an elongated frame having a pressurized interior chamber is volumetrically related and communicatively connected to a longitudinally-slotted cylinder supported within the frame so that expansion of compressed air into the cylinder produces a desired thrust pressure that is equalized by the residual pressure external of the cylinder within the chamber. A piston member slidably contained within the cylinder is adapted to receive the compressed air and is connected to a shuttle for accelerating the aircraft to be launched. The shuttle is releasably restrained at the rearward end of the cylinder and is adapted to travel longitudinally through the slot which is dynamically sealed by a flexible strip as the shuttle passes through the slot to preserve thrust pressure within the cylinder. Means for braking the shuttle after launch include a hydraulic shock absorber connected to the frame at the forward end of the cylinder, and a longitudinal elastomeric member attached at one end thereof to the shock absorber within the cylinder. The elastomeric member is formed having a gradually reduced cross-sectional area from either end thereof so that upon impact by the moving shuttle, the longitudinal surface of the member expands against the inside of the cylinder to dissipate a portion of the kinetic energy therealong and provide sufficient dampening, in cooperation with the absorber, to effectively brake the shuttle near the forward end of the frame.

For a better understanding of these and other aspects of the present invention, reference may be made to the following detailed description taken in conjunction with the accompanying drawings in which like reference numerals designate like parts throughout the figures thereof.

BRIEF DESCRIPTION OF THE DRAWINGS

FIG. 1 is a side elevation, partially broken away, of an aircraft launcher according to the present invention;

FIG. 2 is a sectional view of the aircraft launcher taken on the line 2—2 in FIG. 1;

FIG. 3 is a partial top plan view of the forward end of the aircraft launcher of FIG. 1; and FIG. 4 is a sectional view of the aircraft launcher taken on the line 4—4 in FIG. 3.

DESCRIPTION OF THE PREFERRED EMBODIMENT

Referring now to FIG. 1, there is shown an aircraft launcher, generally designated 10, mounted in an inclined position upon a horizontal platform 12, such as the deck of a ship. An elongated frame 14 is formed having a closed chamber 16, described in greater detail hereinafter, wherein an amount of compressed air is stored prior to launch. A mounting plate 18 having a pivot 20 centrally projecting therefrom is attached to each side of frame 14 to provide pivotal attachment for inclining the launcher 10. A mounting post 22 engages the pivot 20 on each side of frame 14 for pivotally supporting the launcher 10 and is rotatably coupled to platform 12 to permit turning of the launcher in various directions. A link rod 24 interconnects the base of post 20 with the bottom of frame 14 and is adjustable in length to vary the angle of inclination of the launcher 10.

The frame 14 is a rigid, lightweight structure having a track 26 formed along the top surface thereof. As better shown in FIG. 2, the body of frame 14 is composed of an inner and outer skin, 28 and 30 respectively, of a light, yet sturdy material, such as fiberglass. The inner skin 28 and outer skin 30 are similarly shaped in the form of a rounded rectangle, open along the top of frame 14. The skins 28 and 30 are spaced apart and filled with a foam material 32 to provide structural support thereto. A pair of elongated rectangular bars 34 of a wear-resistant material are parallely positioned along the top of frame 14 and attached along opposite faces thereof to the edges of the skins 28 and 30 so that a slot S is formed between the inward faces of the bars.

A launch cylinder 36 having a cross-sectional area A, typically about 30 square inches, extends the length of frame 14 within the chamber 16. As better shown in FIG. 2, the launch cylinder 36 is fabricated in a similar manner as the frame 14, having C-shaped inner and outer skins, 38 and 40 respectively, spaced apart and filled therebetween with a foam material 42 for structural support. The edges of skins 38 and 40 are attached to the bottom faces of respective bars 34 on both sides of slot S so that the cylinder 36 is suspended within chamber 16 having a longitudinal opening that aligns with the slot. One end of launch cylinder 36 is opened to the chamber 16 at the rearward end of frame 14 so that the compressed air stored within the chamber is permitted to expand into the cylinder during launch thereby exerting a thrust pressure within the cylinder for launching the aircraft that is equivalent to the chamber pressure being exerted upon the outside of the cylinder. Accordingly, outward distortion of the cylinder 36 along slot S is eliminated during launch, while the cylinder retains a degree of longitudinal flexibility. An exhaust pipe 44 is located a distance L, typically in the range of 30 feet, from the open end of the launch tube 36 to vent the compressed air to the atmosphere after launch. Accordingly, the distance L marks the launch stroke of launcher 10.

Chamber 16 is bounded by the inner skin 28 of frame 14 and the outer skin 40 of launch cylinder 36, and is sealingly closed at both ends of the frame. Valve 49 located at the rearward end of frame 14 permits charging of the chamber 16 with the compressed air. The volume of chamber 16 is in the range of ten to twenty times the volume of launch cylinder 36, defined as the cross-sectional area A times the launch stroke L, in order to minimize the reduction in thrust pressure in the cylinder during expansion of the air through the launch stroke, and thereby lessen the initial chamber pressure required to achieve a desired launch velocity. It should be noted that the thrust pressure exerted by the compressed air as it expands through the launch cylinder 36 along the launch stroke is determinable by Boyle's law, $$\frac{p_1}{p_2} = \frac{V_2}{V_1};$$

where $V_1$ is the volume of chamber 16, $V_2$ is the combined volumes of the chamber and the launch cylinder 36, $p_1$ is the initial pressure within the chamber and $p_2$ is the desired thrust pressure. The known volumetric relationship between the chamber 16 and the launch cylinder 36 permits initially charging the chamber to a predetermined pressure that will render, upon expansion of the air throughout the launch stroke, the desired thrust pressure within the cylinder sufficient to accelerate the particular aircraft to the desired launch velocity.

A plurality of rigid webs 46 are laterally positioned and parallely spaced apart within chamber 16 throughout the length of frame 14. The webs 46 are formed to be connected along the edges thereof to the inner skin 28 of frame 14 and the outer skin 40 of launch cylinder 36 to provide structural support to both the frame and the cylinder. Holes 48 are provided in each web 46 to permit the free flow of the compressed air through the chamber 16.

A shuttle, generally designated 50, is shown in FIG. 1 in phantom in the battery position at the rear of launcher 10, and again, near the forward end of frame 14 at the end of the launch stroke. The shuttle 50 is provided with a platform 52 for carrying an aircraft (not shown) forwardly along the top of frame 14 guided by track 26. The shuttle 50 is formed having a neck 54 that vertically extends through slot S and the opening at the top of launch cylinder 36, and is provided with a cambered base 56 that slidingly fits within the cylinder. A piston member 58 having a diameter slightly less than that of launch cylinder 36 is attached to the rearward end of base 56 to receive the compressed air from chamber 16. A cylindrical plunger 60 having a diameter that permits sliding engagement within launch cylinder 36 is connected at the forward end of base 56 to provide a braking surface for shuttle 50 after launch. A clamp mechanism 62 is located at the rearward end of frame 14 and grips the shuttle 50 thereby retaining it in the battery position prior to launch. The clamp mechanism 62 is of a conventional mechanical design with hydraulic controls to slowly release the shuttle 50 so that the onset of the launching force applied by the compressed air upon piston member 58 is controlled.

A flexible strip 64 attached at the rearward end of frame 14 longitudinally extends the length of the frame along slot S to seal the launch cylinder 36. The strip 64 is routed through base 56 of shuttle 50 along the cambered surface thereof so that as the shuttle travels along the frame, the strip is deflected out of the forward path of neck 54 through slot S and guided back into sealing position within the launch cylinder 36 behind the moving piston 58 to preserve operating pressure in the cylinder. A spring-loaded clamp 66 located at the forward end of frame 14 holds the strip 64 under tension to reduce whipping of the strip forward of the moving shuttle 50.

A hydraulic shock absorber 68 of a conventional design is attached to the forward end of frame 14 coaxially with launch tube 36 to dampen the forward motion of shuttle 50 at the end of the launch stroke. As better shown in FIG. 4, the absorber 68 includes a piston rod 70 adapted to slide within a cylindrical casing 72 filled with a hydraulic fluid 74. A cylindrical-like cushion 76 of an elastomeric material, such as neoprene, is attached at one end thereof to the piston rod 70 within the launch cylinder 36. The cushion 76 is formed having the ends thereof of a sufficient diameter to fit snugly within the launch cylinder 36 and having a gradually reduced diameter inwardly from each end, typically in a concave manner, so that as the cushion moves a distance B upon the impact of plunger 60 at the end of the launch stroke, the longitudinal surface of the cushion expands against the inner skin 38 of the launch cylinder to absorb the initial impact of the shuttle 50 and frictionally dissipate a portion of the kinetic energy thereof. Thus, cushion 76 reduces the severity of the impact upon shock absorber 68 and, in cooperation with the absorber, effectively dampens the forward motion of the shuttle 50 within the distance B so that the shuttle is stopped near the forward end of frame 14 without damage to the launcher structure.

Operation of the aircraft launcher 10 will now be discussed with reference to FIGS. 1 through 4. With shuttle 50 held in battery position by clamp mechanism 62, the chamber 16 of frame 14 is charged with compressed air via valve 49 to an initial pressure, typically about 200 psi. The initial chamber pressure is predetermined by applying Boyle's law, knowing the thrust pressure required to reach launch velocity within launch stroke L, and the volumetric ratio between chamber 16 and launch cylinder 36. The pressure of chamber 16 is applied to piston 58 on shuttle 50 at the rearward end of the launch cylinder (indicated by the arrow in FIG. 1), and is exerted upon the outer skin 40 of the launch cylinder along the length thereof.

When the clamp mechanism 62 releases shuttle 50, the compressed air within chamber 16 expands into the launch cylinder 36 thereby driving the shuttle forwardly along frame 14 through launch stroke L of the cylinder. Expansion of the compressed air from the chamber 16 into the launch cylinder 36 suspended therein, produces thrust pressure within the cylinder upon inner skin 38 that is equal to the pressure within the chamber upon outer skin 40 thereby preventing outward distortion of the cylinder along slot S during launch stroke L. As the shuttle 50 travels forward through slot S, strip 64 positioned within the slot to close the top of the cylinder 36 is deflected out of the path of the shuttle by the cambered surface of base 56, and then guided back into sealing position along the slot to maintain thrust pressure through launch stroke L.

At the end of launch stroke L, the compressed air is vented to the atmosphere via exhaust pipe 44 to permit arrestment of the shuttle by cushion 76 and shock absorber 68. When plunger 60 strikes cushion 76 near the forward end of frame 14, the cushion absorbs the initial impact of the shuttle and frictionally dissipates the kinetic energy thereof by expanding against inner skin 38 as it moves a distance B against piston rod 70 of shock absorber 68 (shown in phantom in FIG. 4). Forward motion of the shuttle 50 is thereby sufficiently dampened to minimize shock to the structure of launcher 10, and the shuttle is stopped near the forward end of frame 14.

Therefore, it is apparent that the disclosed aircraft launcher provides an improved pneumatic system wherein a longitudinally-slotted launch cylinder withstands distortion along the slot from the thrust pressure internal of the cylinder during operation, while retaining a degree of longitudinal flexibility that accommodates minor lateral movements of the launching mechanism during operation. In addition, the present invention provides a launching system wherein the high-speed motion of the unlaunched mechanism is effectively dampened within a limited stroke so as to avoid damage to the system structure. Furthermore, the disclosed aircraft launcher is lightweight and simple in construction, yet sturdy and reliable in operation.

Obviously, other embodiments and modifications of the present invention will readily come to those of ordinary skill in the art having the benefit of the teachings presented in the foregoing description and drawings. Therefore, it is to be understood that this invention is not to be limited thereto, and that said embodiments and modifications are intended to be included within the scope of the appended claims.

What is claimed is:

1. A pneumatic system for launching an aircraft, comprising:
   an elongated frame having a closed chamber adapted to be filled with an amount of compressed air; and
   a launch cylinder provided with a longitudinal slot and suspended within the chamber of said frame with the slot exposed to the atmosphere, said cylinder being coupled at one end thereof to the chamber to receive compressed air therefrom so that expansion of the compressed air into the cylinder produces a thrust pressure therein equal to pressure external to the cylinder within the chamber thereby preventing outward distortion of the cylinder along the slot during launch.

2. A pneumatic launching system according to claim 1, further comprising:
   exhaust means connected to said launch cylinder at a distance along the length of said cylinder for venting said cylinder to the atmosphere, the distance from the open end of said cylinder being the launch stroke thereof;
   a piston member slidably positioned within said cylinder to receive the compressed air;
   shuttle means connected to said piston member and adapted to travel through the slot of said cylinder for carrying the aircraft to launch velocity; and
   closure means for sealing the slot of said cylinder as said shuttle means travels therethrough.

3. A pneumatic launching system according to claim 2, wherein the volume of the chamber of said frame is in the range of ten to twenty times greater than the volume of said cylinder to minimize the reduction of system pressure during expansion of the compressed air through the launch stroke of said cylinder.

4. A pneumatic launching system according to claim 1, further comprising:
   holdback means connected to said frame for releasably retaining said shuttle means at the open end of said cylinder.

5. A pneumatic launching system according to claim 4, further comprising:
   impact absorbing means operatively connected to said frame for stopping said shuttle means at the closed end of said cylinder.

6. A pneumatic launching system according to claim 5, wherein said impact absorbing means comprises:
   shock absorbing means connected to said frame at the closed end of said cylinder for dampening the travel of said shuttle means at the end of the launch stroke; and
   elastomeric cushion means attached to said shock absorbing means within said cylinder near the closed end thereof for frictionally dissipating kinetic energy of said shuttle means against the inside of said cylinder as said cushion means moves against said shock absorbing means.

7. A pneumatic launching system according to claim 6, wherein said cushion means comprises:

a longitudinal cushion member formed of a solid elastomeric material and having a gradually reduced cross-section from either end thereof, the ends of said member fitting snugly within said cylinder.

8. A braking device for absorbing the impact of a shuttle adapted to travel forwardly through a pressurized cylinder of an aircraft launcher, comprising:

shock absorbing means coaxially connected to the forward, external end of the cylinder for dampening the travel of the shuttle; and elastomeric cushion means attached to said shock absorbing means and located within the pressurized cylinder, said cushion means including: a longitudinal cushion member formed of a solid elastomeric material and having a gradually reduced cross-section from either end thereof, the ends of said member fitting snugly within said cylinder, said reduced cross-section expanding, upon impact of said shuttle, into engagement with the inside of said pressurized cylinder for frictionally dissipating kinetic energy of the shuttle along the inside of the cylinder as said cushion means moves against said shock absorbing means.

* * * * *